Patented Feb. 2, 1932

1,843,214

UNITED STATES PATENT OFFICE

CAMILLE DREYFUS, OF BASEL, SWITZERLAND, WILLIAM McC. CAMERON, OF NEW YORK, N. Y., AND GEORGE SCHNEIDER, OF CUMBERLAND, MARYLAND, ASSIGNORS TO CELANESE CORPORATION OF AMERICA, A CORPORATION OF DELAWARE

MANUFACTURE OF COMPOSITIONS AND ARTICLES FROM CELLULOSE DERIVATIVES

No Drawing.    Application filed February 8, 1924. Serial No. 691,499.

This invention relates to the manufacture of compositions and articles made from esters or ethers of cellulose and in particular from cellulose acetate hereinafter included in the term cellulose derivatives.

It has been proposed to make compositions of cellulose acetate by admixture with camphor substitutes or softening agents with or without the addition of other materials, but the compositions so obtained are either too soft or too hard or too brittle and/or show other faults such as separation of one or more of the ingredients on the surface of the articles made from said compositions hereinafter termed "bloom".

We have discovered that compositions of superior quality not showing the defects above stated are obtained if these cellulose derivatives such as cellulose acetate are heated with a mixture of plasticizing agents and if those mixtures are mixed in the correct proportions.

Under the term of plasticizing agents we understand, for instance high boiling solvents, camphor substitute, softening agents, solid and liquid plasticizers, etc.

Under the term of solid plasticizing agents we understand, for instance, para-toluol-sulphonamide, para-toluol-sulphonimide, other members of this immediate series, etc.

Under the term of liquid plasticizing agents we understand, for instance, diethyl phthalate, triacetin, xylene monomethyl sulphonamide, etc.

The term "pressed or molded articles" where used is to be understood in a wide sense to include any articles or objects produced by pressing under heat, whether in or upon molds or matrices with or without employment of cores or re-inforcements, or onto supports, carriers or backings, or into or between sheets or re-inforcements of paper, cardboard, wood or other material, or by extrusion through dies or in any other manner.

The invention is applied with particular advantage to the manufacture of gramophone, phonograph, talking machine or sound records of all descriptions; electrical articles, such as switchboards, distributor heads for motor car ignition systems, etc. but is also applicable for the manufacture of molded articles and objects in general.

The invention is particularly applicable for the production of pressed or molded articles having a basis of cellulose acetate and will be particularly described in relation to cellulose acetate but cellulose esters or other organic esters or cellulose ethers or mixtures of such ethers and/or esters may be employed wholly or partly instead of cellulose acetate.

According to the invention the cellulose derivative or derivatives, in particular cellulose acetate, can be melted together with the plasticizing agents, which term includes any known or suitable plasticizing agents, high boiling point solvents, or camphor substitutes, in a pot or any other suitable way, with or without addition of resins, for example, common rosin, acaroid resin, coumarin resins, shellac, etc. and with or without other desired additions, such as, dyes, pigments, non-inflammability agents, stabilizers or in some cases filling material, and after the melted mass has been allowed to solidify, preferably by running it into sheets, slabs, or other convenient form, it is ground to powder, and the powder, either directly, or after working up on heated rolls, with or without powdered filling materials, dyes, pigments, non-inflammability agents, stabilizers or other desired additions, is pressed under heat in molds or matrices from dies or onto or between carriers, backings or the like or otherwise, to form articles or objects of any kind.

In order to more fully illustrate the invention the following might be given as an example by which a bad quality of sound record or other article is produced:

Ten (10) parts of cellulose acetate are mixed with 5 parts of para-toluol-sulphonamide, and then mixed on the malaxating rolls with 15 parts of a mixture of filling materials consisting of dyes and pigments, and the resulting mass then pressed in any known fashion into sound records. The resulting articles or sound records are poor in quality and show a poorly polished surface which continually blooms.

In case of some desired additions, for example, dyes, non-inflammability agents, such as triphenyl or tricresyl phosphate, stabilizers, such as, alkyl or aryl urea derivatives, etc. one or more of which are usually added in substantial proportions, these may be added to the cellulose derivative mixture before the melting but should be incorporated or mainly incorporated after melting or grinding.

Instead of melting the cellulose acetate or cellulose derivatives together with the plasticizing agents in a pot this can be done directly in conjunction with the filling material on hot rollers; the cellulose acetate, for instance, being mixed together with the plasticizing agents or other substances and filling material, pigments, etc. directly on the rolls.

In this case, that is, incorporation of the ingredients on the rolls, it is sometimes desirable to make additions of volatile liquids to assist the initial rolling conditions; such liquids being volatilized before the completion of the rolling. Such liquids may or may not be solvents for the cellulose derivative, as for instance, ethyl alcohol, benzol, acetone, etc. but it is desirable to employ such liquids or mixture of liquids as are solvents for the cellulose derivative only at higher temperatures, such as, for instance, mixtures in various proportions of alcohol and benzol or alcohol, benzol and acetone, etc.

The resulting mass may be powdered or pressed into molds or used in any other suitable way for the manufacture of sound records or other articles. To this end we give the following three examples of the invention, which are applicable more particularly to the production of gramophone or talking machine records and other pressed or molded articles, it being understood that these examples are given only by way of illustration and that the ingredients and proportions can be varied widely according to the articles to be made, the degree of softness required in the finished articles or other requirements, without departing from the invention:

*Example I.*—100 parts cellulose acetate in powdered form, for instance, are heated with a mixture of 27 parts of di-para-toluol-sulphonimide and 13 parts of para-toluol-sulphonamide, 10 parts diethyl phthalate and 10 parts rosin and 160 parts, more or less, of filler consisting, for instance, of a mixture of rotten stone, china clay, iron oxide, lamp black and small quantities of cotton flock. This whole mixture is mixed up homogeneously and in this state is put on hot malaxating rolls until the mass is homogeneously molten. At this stage it can be sheeted on a slabbing machine; the individual slabs are then resoftened on a steam table and placed under the sound record matrice, where with heat and pressure sound records are produced.

Instead of proceeding in this fashion the above mixture can be melted directly in a pot or the homogeneous mixture may be directly molded in any appropriate molding apparatus. The sound records or articles obtained do not bloom and show a remarkable flexibility, resiliency, strength and toughness with, when in the form of sound records, excellent sound producing qualities and freedom from needle noise.

*Example II.*—75 parts of cellulose acetate in powdered form, for instance, are heated with a mixture of 27 parts of para-toluol-sulphonimide and 13 parts of para-toluol-sulphonamide, 10 parts diethyl phthalate and 10 parts rosin and 160 parts, more or less, of filler, consisting, for instance, of a mixture of rotten stone, china clay, mica, iron oxide lamp black, and small quantities of cotton flock. This whole mixture is homogeneously mixed by either melting as a whole in an appropriate pot or other apparatus and then molded into slabs or sheets from which sound records or other articles may be produced by softening and pressing into the desired form or by combining the ingredients on rolls or otherwise treated as in Example I.

The product obtained by the above method and proportion of ingredients is of a slightly different character than obtained by Example I, softening at a lower temperature and having physical characteristics particularly desirable for certain articles of commerce, such as, electrical moldings, parts of various instruments, etc.

*Example III*—100 parts of cellulose acetate in powdered form, for instance, are heated with a mixture of 27 parts, of para-toluol-sulphonimide and 13 parts of para-toluol-sulphonamide, 10 parts diethyl phthalate and 10 parts rosin, 160 parts, more or less, of filler consisting, for instance, of a mixture of rotten stone, china clay, mica, iron oxide, lamp black, and small quantities of cotton flock, and to this is added 10 to 20 parts of a volatile liquid or mixture of liquids such as alcohol and benzol to assist the initial rolling conditions. This whole mixture is mixed up homogeneously and in this state it is put on hot malaxating rolls until the mass is homogeneously molten and until the volatile liquid or liquids are substantially volatilized. At this stage it can be sheeted on a slabbing machine; the individual slabs are then softened on a steam table and placed under the sound record matrice, where the heat and pressure sound records are produced.

What we claim is:

1. A process for the manufacture of molded articles comprising heating an organic derivative of cellulose with para-toluol-sulphonamide, para-toluol-sulphonimide, diethyl phthalate and rosin and thereafter subjecting the mixture to heat under pressure.

2. A process for the manufacture of molded articles comprising heating an organic derivative of cellulose with para-toluol-sulphonamide, para-toluol-sulphonimide, diethyl phthalate, rosin, filling material and a volatile liquid and thereafter subjecting the mixture to heat under pressure.

3. Process for the manufacture of molded articles comprising mixing together 75 to 100 parts of cellulose acetate, 27 parts of para-toluol-sulphonimide, 13 parts para-toluol-sulphonamide, 10 parts diethyl phthalate, 10 parts rosin, and about 160 parts of filling materials and thereafter subjecting the mixture to heat under pressure.

4. Process for the manufacture of molded articles comprising mixing together 75 to 100 parts of cellulose acetate, 27 parts of para-toluol-sulphonimide, 13 parts of para-toluol-sulphonamide, 10 parts diethyl phthalate, 10 parts rosin, about 160 parts of filling materials, and 10 to 20 parts of volatile liquid, and thereafter subjecting the mixture to heat under pressure.

5. A composition for the manufacture of molded articles comprising 75 to 100 parts cellulose acetate, 10 parts para-toluol-sulphonimide, 13 parts para-toluol-sulphonamide, 10 parts diethyl phthalate, 10 parts rosin, and about 160 parts filling material.

6. A composition for the manufacture of molded articles comprising 75 to 100 parts cellulose acetate, 10 parts para-toluol-sulphonimide, 13 parts para-toluol-sulphonamide, 10 parts diethyl phthalate, 10 parts rosin, about 160 parts filling material, and a volatile liquid.

7. A composition for the manufacture of molded articles comprising an organic derivative of cellulose, para-toluol-sulphonamide, para-toluol-sulphonimide, diethyl phthalate and rosin.

8. A composition for the manufacture of molded articles comprising an organic derivative of cellulose, para-toluol-sulphonamide, para-toluol-sulphonimide, diethyl phthalate, rosin, filling material and the volatile liquid.

9. Molded articles comprising an organic derivative of cellulose, para-toluol-sulphonamide, para-toluol-sulphonimide, diethyl phthalate and rosin.

10. Molded articles comprising an organic derivative of cellulose, para-toluol-sulphonamide, para-toluol-sulphonimide, diethyl phthalate, rosin and a filling material.

CAMILLE DREYFUS.
WILLIAM McC. CAMERON.
GEORGE SCHNEIDER.